United States Patent [19]
Lagarde et al.

[11] Patent Number: 5,857,553
[45] Date of Patent: Jan. 12, 1999

[54] REDUCER WITH OLDHAM COUPLING

[75] Inventors: Eric Paul Lagarde, Sallanches; Philippe-Marc Lemarchand, Taninges, both of France

[73] Assignee: Somfy, France

[21] Appl. No.: 851,506

[22] Filed: May 5, 1997

[30] Foreign Application Priority Data

May 28, 1996 [FR] France .................................. 96 06552

[51] Int. Cl.[6] ............................. E06B 9/68; F16H 3/44; F16D 3/04
[52] U.S. Cl. ............................. 192/7; 475/301; 160/309; 464/104
[58] Field of Search ................................ 475/301; 192/7; 160/291, 298, 309, 310, 321; 464/104, 105

[56] References Cited

U.S. PATENT DOCUMENTS

| | | | |
|---|---|---|---|
| 4,392,635 | 7/1983 | Muessel et al. | 464/105 X |
| 4,513,805 | 4/1985 | Mase | 475/301 X |
| 4,848,433 | 7/1989 | Bresson et al. | |
| 5,447,477 | 9/1995 | Bresson | 160/310 X |

FOREIGN PATENT DOCUMENTS

| | | |
|---|---|---|
| 0 163 927 A | 12/1985 | European Pat. Off. . |
| 35 10 549 A | 10/1985 | Germany . |

*Primary Examiner*—Richard M. Lorence
*Attorney, Agent, or Firm*—Laff, Whitesel, Conte & Saret, Ltd.

[57] ABSTRACT

Reducer comprising at least one stage and associated with a nonreturn device and with an Oldham coupling. The nonreturn device consists of two tubular seats fitted one into the other and of a helical spring braking by expansion against the casing of the reducer. The Oldham cross is seated within the nonreturn device. The reducer, the nonreturn device and the Oldham coupling are seated within the casing and are retained axially in the latter by a ring capable of receiving an adapter piece for mounting the assembly in a frame. The assembly forms a compact unit which can be handled easily.

7 Claims, 2 Drawing Sheets

REDUCER WITH OLDHAM COUPLING

FIELD OF THE INVENTION

The subject of the invention is a reducer associated with a nonreturn device and with an Oldham coupling and comprising a cylindrical casing containing at least one planetary reduction stage seated in a cylindrical casing.

This reducer is intended particularly for the motorized or manual drive of a roller blind or shutter.

PRIOR ART

An assembly consisting of a motor, of a reducer, of a braking device and of an Oldham coupling, which are placed end to end, is known. This assembly is inconvenient to handle because the components of the Oldham coupling are not retained mechanically on the reducer and therefore risk separating from the latter and falling during handling operations. To diminish this risk, it is therefore advisable to provide the components of the Oldham coupling with grease which ensures sufficient adhesion to prevent these components from separating. When the reducer is in operation, however, this grease is useless and even troublesome with regard to components made of plastic, which is increasingly the case nowadays.

SUMMARY OF THE INVENTION

The object of the invention is to avoid having to resort to such an expedient and to bring about an actual integration of the Oldham coupling and the nonreturn device in the reducer, so as to obtain a component having optimum convenience as regards handling it and mounting it in an assembly.

The object of the invention is also to reduce the overall size of such a component.

For this purpose, the reducer according to the invention is defined in that the movable output member of the last reduction stage consists of a first piece in the form of a cylindrical bell, the cylindrical wall of which has an interruption and into which is fitted a second bell-shaped piece having externally a radially projecting part engaged in the interruption of the first bell-shaped piece, for driving it in rotation, and internally a diametral groove, in which one of the sides of the Oldham cross is engaged, this Oldham cross being seated entirely within the two bell-shaped pieces, in that the nonreturn device consists of a helical spring, known per se, which surrounds the first piece and the ends of which are attached to each of the edges of the interruption, and in that the two bell-shaped pieces are located within the cylindrical casing of the reducer, and the two bell-shaped pieces as well as the output member of the Oldham coupling are retained axially in the casing by a retaining ring fastened to the end of the casing, nonreturn braking being ensured by the laying of the spring against the casing.

The cross of the Oldham coupling is thus located entirely within the nonreturn device, thus affording an appreciable reduction in the length of the assembly, without any increase in its diameter, since this diameter is determined by the diameter of the satellite carrier of the reducer.

The reducer takes the form of a cylinder equipped at one of its ends with the axial retaining ring. This cylinder forms a perfectly integrated component which is very convenient to handle.

The retaining ring, preferably simply notchfastened in the casing of the reducer, is advantageously used for the notch-fastening of an adapter piece for mounting the reducer in the frame of a blind, in particular of a venetian blind.

BRIEF DESCRIPTION THE DRAWING

The accompanying drawing illustrates an embodiment of the invention by way of example.

DESCRIPTION OF THE PREFERRED EMBODIMENT

Figure 2:
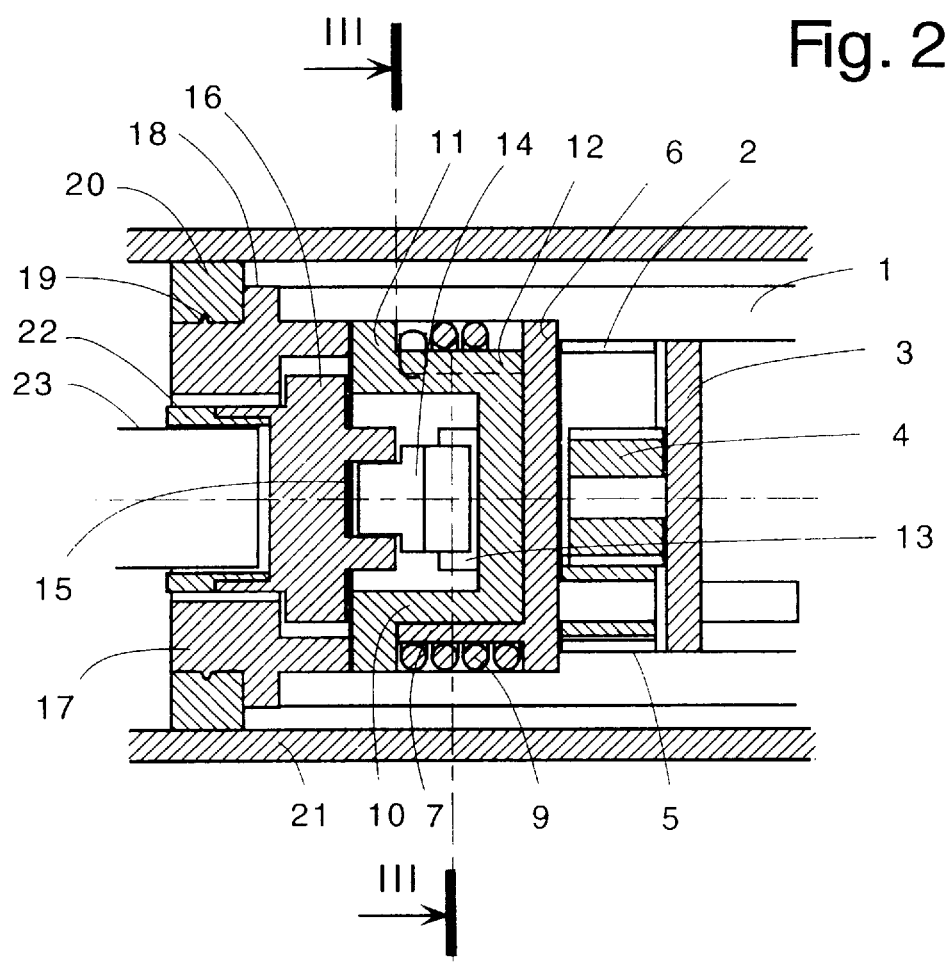
FIG. 2 is a view in axial section of the reducer.
Figure 3:
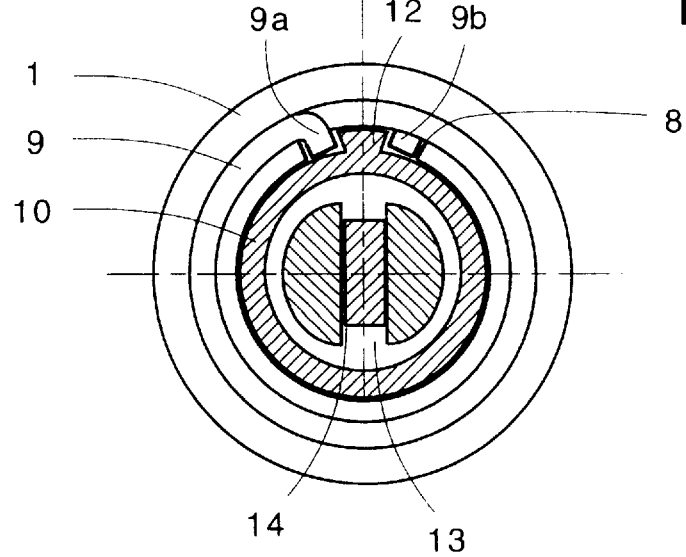
FIG. 3 is a view in radial section according to III—III in FIG. 2.

The actual reducer is a three-stage reducer consisting of a cylindrical casing 1 which is closed on the input side of the reducer and on the inner wall of which a crown 2 is formed. In FIG. 2 there can be seen the satellite carrier 3 of the second stage, the satellite carrier being integral with the third planet wheel 4 which drives three satellites 5 carried by a satellite carrier 6. The satellites mesh with the crown 2. The satellite carrier 6 forms part of a piece 7 in the form of a cylindrical bell or first tubular seat having an interruption 8. Wound on this piece 7 is a helical spring 9, the bent ends 9a and 9b of which are attached to each of the edges of the interruption 8. Engaged in the piece 7 is a second bell-shaped piece or second tubular seat 10, the cylindrical outer surface of which is fitted into the piece 7 and the edge of which is equipped with an annular flange 11 of the same diameter as the satellite carrier 6. The piece 10 has a radial projection 12 engaged in the interruption 8 between the ends 9a and 9b of the spring 9. The pieces 7 and 10, the spring 9 and the casing 1 form a nonreturn device known per se, described, for example, in the patent DE 35 04 489. In a particular direction of rotation, the diameter of the spring 9 decreases, allowing the device to rotate freely within the casing 1, whilst, in the other direction of rotation, the diameter of the spring 9 increases and the latter is laid against the casing 1, in such a way that the piece 10 is braked.

The piece 10 also forms the input member of the Oldham coupling. For this purpose, the bottom of the piece 10 has a diametral groove 13 forming the input slideway for an Oldham cross 14. The other slideway 15 is formed in an output member 16 which, on its opposite face, has a recess 24 of hexagonal shape. The Oldham cross 14 is located entirely within the piece 10, the latter being itself entirely within the casing 1. The assembly consisting of the pieces of the reducer, of the brake and of the Oldham coupling is retained axially in the casing 1 by a ring 17 equipped with an annular bead 18, by means of which said ring is notch-fastened in a flute of the casing 1. The retaining ring 17 is, furthermore, locked in terms of rotation in the casing 1. On the outside, the retaining ring 17 has a second annular bead 19 intended for the notch-fastening of an adapter piece 20 for mounting the reducer in a frame 21 of a blind, in particular a venetian blind. The output member 16 of the Oldham coupling can receive an adapter 22 if the cross section of the shaft 23 to be driven does not correspond to the cross section 24. As may be seen in FIG. 2, this adapter is seated entirely within the retaining ring 17.

The other end of the casing 1 has two lugs 25 intended for fastening the reducer to a motor, and the bottom of the casing is equipped with a metal flange serving as a bearing for the input planet wheel.

Figure 1:
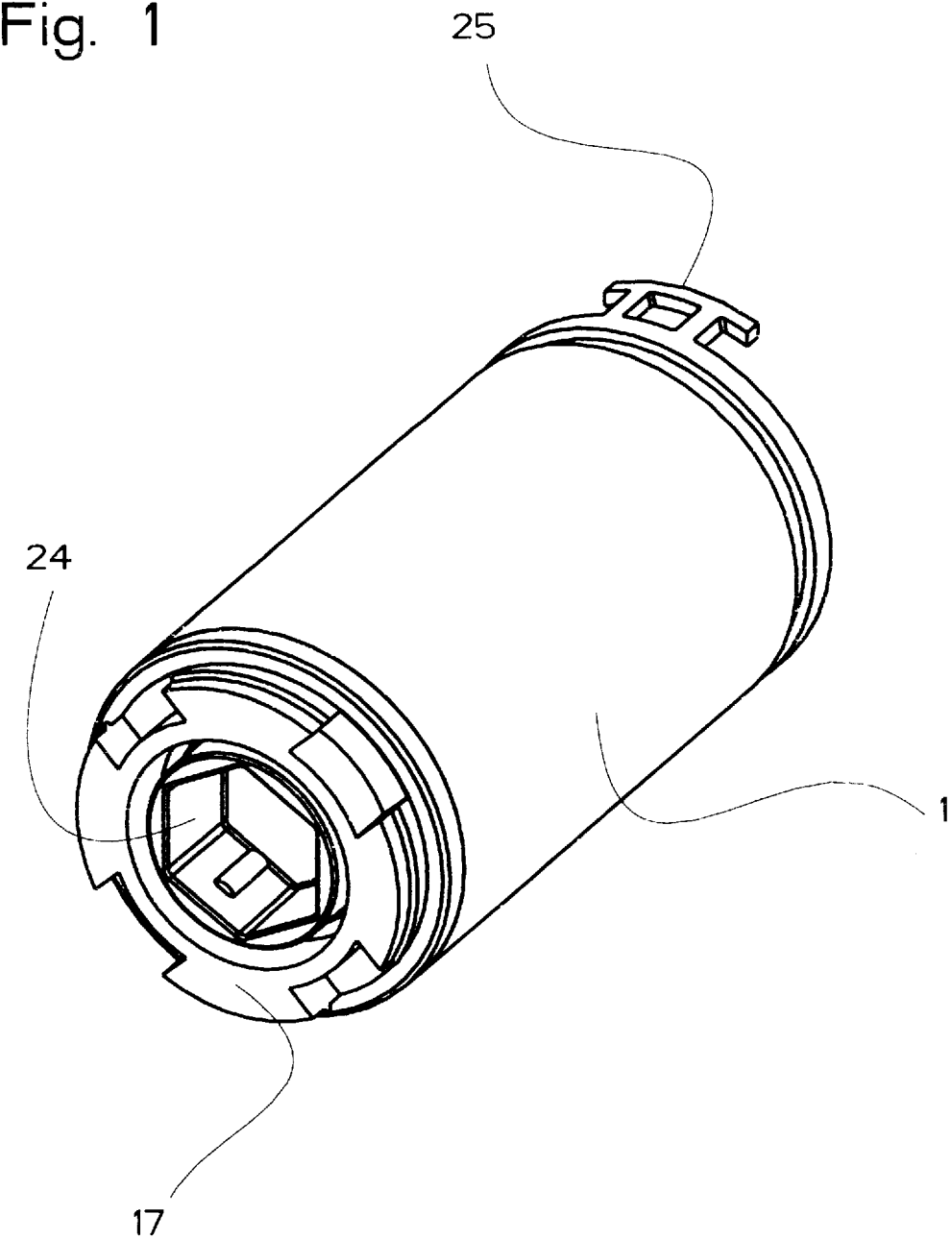
FIG. 1 is a perspective view of the reducer.

As FIG. 1 shows, the reducer and its associated elements form a perfectly integrated unit which takes the form of a cylinder. In one embodiment, this cylinder has an outside diameter of only 23 mm. This component may be coupled to a motor or to a manual drive. In the second case, the reducer will usually comprise only a single reduction stage.

We claim:

1. A reducer in combination with a nonreturn device and with an Oldham coupling comprising at least one planetary reduction stage seated in a cylindrical casing, wherein a movable output member of a last reduction stage consists of a first tubular seat with a cylindrical wall, said cylindrical wall has an interruption, a second tubular seat seated in said first tubular seat, said second tubular seat having externally a radially projecting part engaged in the interruption of the first tubular seat for driving said first tubular seat in rotation, said second tubular seat having an internal diametral groove in which one of the sides of an Oldham cross is engaged, said Oldham cross being seated entirely within the, second tubular seat, the nonreturn device consists of a helical spring which surrounds the first tubular seat and has ends attached to each of the edges of said interruption, the first and second tubular seats being located within the cylindrical casing of the reducer, and the first and second tubular seats and an output member of the Oldham coupling are retained axially in said casing by a retaining ring fastened to the end of said casing, and nonreturn braking being ensured by laying the spring against the casing.

2. The reducer as claimed in claim 1, equipped with an adapter piece (20) for mounting the reducer in a frame, wherein said adapter piece is fastened to the retaining ring.

3. The reducer as claimed in claim 1, equipped with an adapter piece (22) from the output of the Oldham coupling to a shaft, wherein this adapter piece is seated in the retaining ring.

4. A reducer in combination with a nonreturn device and an Oldham coupling comprising:

at least one planetary reduction stage seated in a casing, a movable output member of the last reduction stage has a first tubular seat having an interruption, a second tubular seat seated in said first tubular seat, said second tubular seat having a projecting part fitting into said interruption for driving said first tubular seat in rotation, said Oldham coupling mounted to said second tubular seat, said nonreturn device has a spring around said first tubular seat and having spring ends which are attached to each of the edges of said interruption, said first and second tubular seats being located within said casing and an output member of the Oldham coupling is retained axially in said casing by a retaining ring fastened to the end of said casing.

5. The reducer as claimed in claim 4, comprising a first adapter piece (20) for mounting the reducer in a frame, and said first adapter piece is fastened to the retaining ring.

6. The reducer as claimed in claim 4, comprising a second adapter piece (22) coupling said output member to a shaft and said second adapter piece being encompassed by said retaining ring.

7. The reducer of claim 5 comprising a second adapter piece coupling said output member to a shaft and said second adapter piece being encompassed by said retaining ring.

* * * * *